Jan. 5, 1926.    1,568,925
S. H. SHAW
AUTOMOBILE BUMPER
Original Filed Feb. 28, 1921
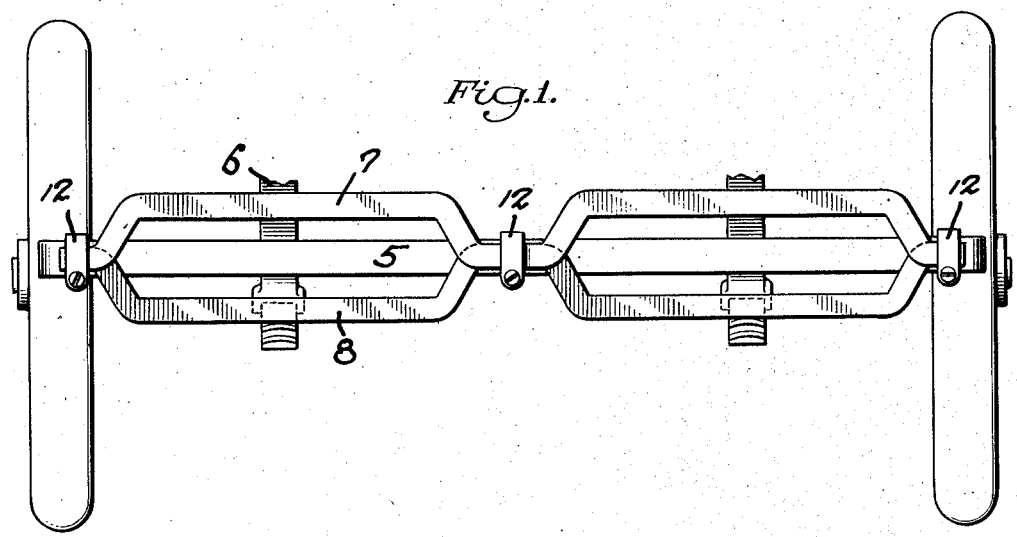
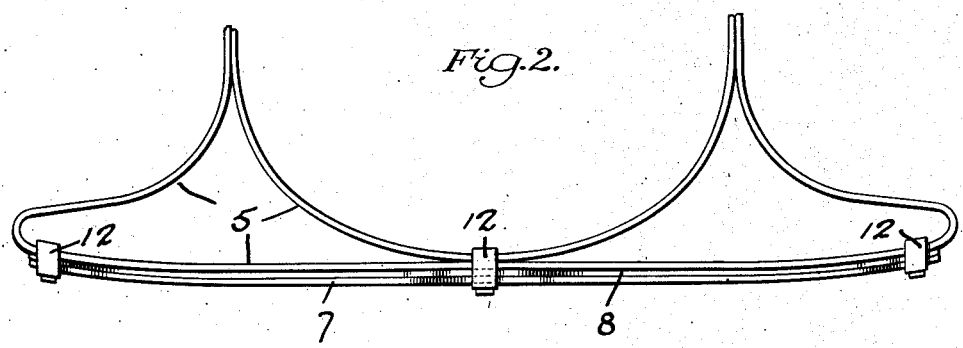
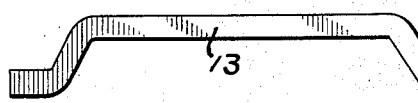
INVENTOR
SAMUEL H. SHAW
BY
his ATTORNEYS Patented Jan. 5, 1926.

1,568,925

UNITED STATES PATENT OFFICE.

SAMUEL H. SHAW, OF NEW YORK, N. Y., ASSIGNOR TO UNIVERSAL SHOCK ELIMINATOR, INC., OF LONG ISLAND CITY, NEW YORK, A CORPORATION OF NEW YORK.

AUTOMOBILE BUMPER.

Original application filed February 28, 1921, Serial No. 448,508, Patent No. 1,431,264, dated October 10, 1922. Divided and this application filed March 25, 1921. Serial No. 455,626.

*To all whom it may concern:*

Be it known that I, SAMUEL H. SHAW, a citizen of the United States of America, residing at New York city, in the county of New York and State of New York, have invented certain new and useful Improvements in Automobile Bumpers, of which the following is a specification.

My invention relates to automobile bumpers, and particularly to the impact member of a bumper, the present application forming a division of my co-pending application Serial No. 448,508, filed February 28, 1921 now Patent #1,431,264, granted October 10, 1922. The object of my invention is to provide an attachment for a standard bumper to increase the impact area of the latter.

In the accompanying drawings—

Fig. 1 is a front elevation of a bumper of spring strap type, to which my attachment is applied;

Fig. 2 is a plan view thereof;

Fig. 3 is a front elevation of one of the attaching bars; and

Fig. 4 is a similar view of a modified construction.

The bumpers in general use today, whether of the resilient or rigid impact member type, are commonly of very slight vertical extent—say from 2¼ to 2½ inches. While a bumper of this type protects as well as possible against a vertical obstruction, such as a post or pole, it is of little value as protection against a horizontal obstruction which does not lie in the plane of the impact element of the bumper. For example, in street traffic, where 80% of all collisions occurs, unless the bumpers of two colliding cars are in the same horizontal plane, practically no protection against injury to fenders and lamps is afforded thereby. Since these bumpers are ordinarily mounted on the chassis side bars, and the latter are at different heights from the ground, not only owing to different constructions of the chassis, but to different wheel diameters, it is seldom the case that the bumpers of two cars register. To meet this difficulty I now provide an impact member attachment which may be readily mounted on the usual bumper and will serve to increase the vertical range of the impact member of the bumper. Just what shape may be given to this attachment, or the particular fastening means for securing the attachment to the bumper, are subsidiary details of the invention—my underlying thought being to provide an attachment mountable on a standard bumper, and having the effect of increasing the vertical range of its impact member.

A second feature of my invention resides in the location of its increased impact area. Certain bumpers have recently appeared upon the market which afford an impact area of greater vertical extent in the mid-portion of the bumper. While this is effective in case of a head-on collision, it is of practically no value where the collision takes place with the vehicles at a material angle to each other, such as occurs when a car is driven out from the curb. A large percentage of accidents to fenders and lamps occurs under just these conditions, and the bumper above mentioned, with increased impact extent in its mid-area, does not take care of this condition. My thought is to provide the impact member of the bumper with an increased vertical range at its end—that is to say outboard of the chassis side bars, and in the vicinity of the fenders and lamps. Such protection may be afforded not only by an attachment of the type before mentioned, which may be applied to bumpers now on the market, but it also may be incorporated in a bumper during the process of manufacture.

While the impact attachment member may applied to bumpers of the rigid impact bar type, the attaching brackets being suitably modified for this purpose, I have shown the invention applied to bumper bars of the spring strap type, since the latter are more common. A bumper 5 of this type is shown in Figs. 1 and 2, the ends of the bumper being carried back as usual and secured, in a manner not indicated, to the chassis side bars. As will be noted, the vertical extent of the impact member is quite limited. It is materially increased by the addition thereto of the impact bars 7 and 8 illustrated. Each of these bars has a shape shown in Fig. 3, the ends 9 and 10 lying in register with an intermediate offset bridge 11, the ends and bridge being arranged in front of the impact member 5 of the bumper in adjusted position, and being secured thereto by stirrup clamps 12. The second bar 8 corresponds to the bar 7, being merely reversed in position, and its end and midbridge portions registering with those of the bar 7, it being gripped and secured to the bumper 5 by the same stirrup clamps 12. The bumper thus comprises a pair of impact bars having parallel straight reaches, bent intermediate their ends at an obtuse angle to the horizontal median line of the bumper and interconnected at said ends, while the planes of the bends intersect substantially at said median line of the bumper at substantially the same point. It will further be clear that the impact bars are juxtaposed and overlapped not only at the offset ends but also at the intermediate offset bridge portions 11, which constitute portions of the impact area of the bumper. The configuration of the impact area of the bumper is thus that of a pair of lozenges arranged end to end, the upper and lower portions of which extend respectively above and below the horizontal median line of the bumper, while between the lozenges extends the parallel sides overlapped and juxtaposed bridge elements 11.

Instead of having the bars extend all the way across the bumper front, as in Fig. 1, a pair of shorter bars 13 of the type shown in Fig. 4 may be used on each side of the bumper, the adjacent ends of the bars being held in position by the mid-clamp 12. If it is desired to limit the increased impact area to the mid-portion of the bumper, a single pair of bars 13 may be arranged at the mid-area of the bumper and secured by clamps 12, one at each end.

Various modifications of form of the impact bars will readily occur to those dealing with the problem, and I do not limit my invention to the precise contours indicated, or the particular attaching means shown.

Thus, as above stated, the impact bars may be incorporated in the bumper during the process of manufacture. Obviously when such is the case, one or the other of the impact elements will have its end carried back to form portion of the supporting structure for the impact bar; for example, the impact bar 7 may have its end carried around in a spring bend toward the chassis in place of the supporting arms of the standard bumper construction shown in Fig. 2. Similarly the bar 8 may have its opposite end carried around in a spring loop to form the supporting arm at the other end of the impact area. In a construction such as this the impact member 5 of the standard bumper would be omitted, its place being taken by the upper and lower bars 7 and 8, the ends of which are recurved to form the supporting arms of the impact element.

I claim—

1. A vehicle bumper comprising an impact bar and a pair of auxiliary bars, each having its ends and mid-portion offset into register with the impact bar, said offset portions being secured to the impact bar and the intermediate areas of said auxiliary bars projecting in opposite directions from the impact bar to increaes its effective vertical range outboard of the side bars of a supporting chassis.

2. An automobile bumper comprising a pair of impact bars having parallel straight reaches bent intermediate their ends at an obtuse angle to the horizontal median line of the bumper and interconnected at said ends.

3. An automobile bumper comprising a pair of impact bars having parallel straight reaches bent intermediate their ends on an obtuse angle to the longitudinal median line of the bumper, the planes of said bends intersecting substantially at the said median line of the bumper.

4. An automobile bumper comprising a pair of impact bars having straight parallel reaches offset to afford juxtaposed overlapped impact areas between the ends of said bars.

5. An automobile bumper comprising a pair of impact bars having straight parallel reaches offset to afford juxtaposed, overlapped impact areas between the ends of said bars, together with reversely bent spring end supports for said impact bars.

6. An automobile bumper comprising a pair of impact bars extending in vertically spaced relation outboard of the side bars of a supporting chassis, and vertically offset toward the longitudinal median line of the bumper intermediate said ends.

7. An automobile bumper comprising a pair of impact bars extending in vertically spaced relation outboard of the side bars of a supporting chassis, and vertically offset toward the longitudinal median line of the bumper at said ends.

8. An automobile bumper comprising a pair of strap metal impact bars extending in vertically spaced relation outboard of the side bars of a supporting chassis, and vertically offset edgewise toward the longitudinal median line of the bumper.

9. An automobile bumper comprising a pair of strap metal impact bars extending in vertically spaced relation outboard of the side bars of a supporting chassis, and vertically offset edgewise toward the longitudinal median line of the bumper intermediate their ends.

10. An automobile bumper comprising a pair of strap metal impact bars extending in vertically spaced relation outboard of the side bars of a supporting chassis, and vertically offset edgewise toward the longitudinal median line of the bumper at their ends.

11. An automobile bumper comprising a pair of complementary inversely arranged impact bars extending across the vehicle front and affording vertically spaced impact areas outboard of the side bars of a supporting chassis, said bars being offset toward the longitudinal median line of the bumper.

12. A bumper bar comprising a plurality of impact elements having straight parallel reaches and offset from each other to form a plurality of widened impact portions and being brought together at their ends to form tapered end impact surfaces arranged outboard of the side bars of a supporting chassis.

13. A bumper bar comprising a plurality of spring elements offset from each other to form a plurality of widened impact portions and brought together at the ends to form tapered end impact surfaces.

14. A bumper bar comprising a plurality of overlapped spring elements offset from each other to form a plurality of inclined ended impact surfaces, one of said surfaces forming a central impact member, and one of the surfaces at each end of the bar being aligned in front of the wheels.

15. A bumper comprising a plurality of overlapped spring strap metal bars forming the impact member of the bumper, certain of said bars being offset from each other to afford a plurality of impact areas of greater vertical extent than the width of the bars, and certain of said areas of greater extent reaching substantially to the plane of the wheels.

16. A bumper comprising a plurality of overlapped spring strap metal bars forming the impact area of the bumper, certain of the bars being offset from each other to afford a plurality of impact areas of greater vertical extent than the width of the bars, certain of said areas of greater extent reaching substantially to the plane of the wheels, together with single spring strap supporting means operatively connected to said impact member substantially in the plane of the wheels.

17. A bumper comprising a plurality of overlapped spring metal bars forming the impact area of the bumper, certain of said bars being offset from each other to afford a plurality of impact areas of greater vertical extent than the width of the bars, and certain of said areas of greater extent reaching substantially to the the plane of the wheels, in combination with spring strap metal supporting arms engaging said impact member at opposite ends, together with supplemental supporting means comprising spring metal strap means engaging said impact member in its mid area.

18. A bumper comprising a plurality of overlapped spring strap metal bars on the impact member of the bumper, certain of said bars being offset from each other adjacent the end and mid area of the impact member to afford a plurality of impact surfaces of greater vertical extent than the width of the bars, spring strap metal supporting arms extending from opposite ends of the impact member, and a supplemental spring strap metal member engaging the central area of the impact member.

In testimony whereof I have signed my name to this specification.

SAMUEL H. SHAW.